United States Patent [19]
Krause, II et al.

[11] Patent Number: 4,886,287
[45] Date of Patent: Dec. 12, 1989

[54] ROW BAR-ACTUATED LAND VEHICLE

[75] Inventors: Alan E. Krause, II, Eureka; Russell G. Willett, Arcata, both of Calif.

[73] Assignee: Jack Cherubini, Yucca Valley, Calif.

[21] Appl. No.: 168,171

[22] Filed: Mar. 15, 1988

[51] Int. Cl.$^4$ .................. A63B 69/06; A62M 1/14
[52] U.S. Cl. ...................... 280/246; 272/72; 272/73; 280/220
[58] Field of Search ............ 272/72, 73, 93, 132, 272/114; 280/220, 230, 233, 234, 282, 244, 265, 246, 248, 253, 252, 225

[56] References Cited

U.S. PATENT DOCUMENTS

| | | | |
|---|---|---|---|
| 1,614,824 | 1/1927 | Bukolt | 280/248 |
| 4,396,188 | 8/1983 | Dreissigacker et al. | 272/72 |
| 4,632,414 | 12/1986 | Ellefon | 280/220 |
| 4,700,962 | 10/1987 | Salmon | 272/72 |

FOREIGN PATENT DOCUMENTS 2830691 1/1980 Fed. Rep. of Germany ........ 272/72

Primary Examiner—Stephen R. Crow
Attorney, Agent, or Firm—Christie, Parker & Hale

[57] ABSTRACT

A wheeled vehicle of the row bar-type for propelling a rider on the vehicle in response to upper body exercise of the rider producing a rowing motion on the row bar includes a frame for supporting the weight of the rider, a front wheel mounted at a front portion of the frame, a pair of rear wheels mounted on opposite sides of the frame, and steering bars extending from opposite sides of the front wheel so the rider can steer the vehicle solely with the feet while propelling the vehicle by pulling on the row bar. The lower portion of the row bar is coupled to a drive mechanism which includes a drive chain extending from the lower portion of the row bar to a drive sprocket mounted on the frame behind the row bar. The drive chain extends from the bottom of the row bar around the drive sprocket and then extends in a forward direction where its end is affixed to a tension cable which, in turn, extends in a forward direction and is wrapped around a stationary pulley affixed to the frame. The cable then extends to the rear of the vehicle where it wraps around a travelling pulley and then extends in a forward direction where its end is affixed to a stationary point on the frame, preferably adjacent the stationary pulley. The opposite end of the travelling pulley is affixed to a return spring.

5 Claims, 3 Drawing Sheets

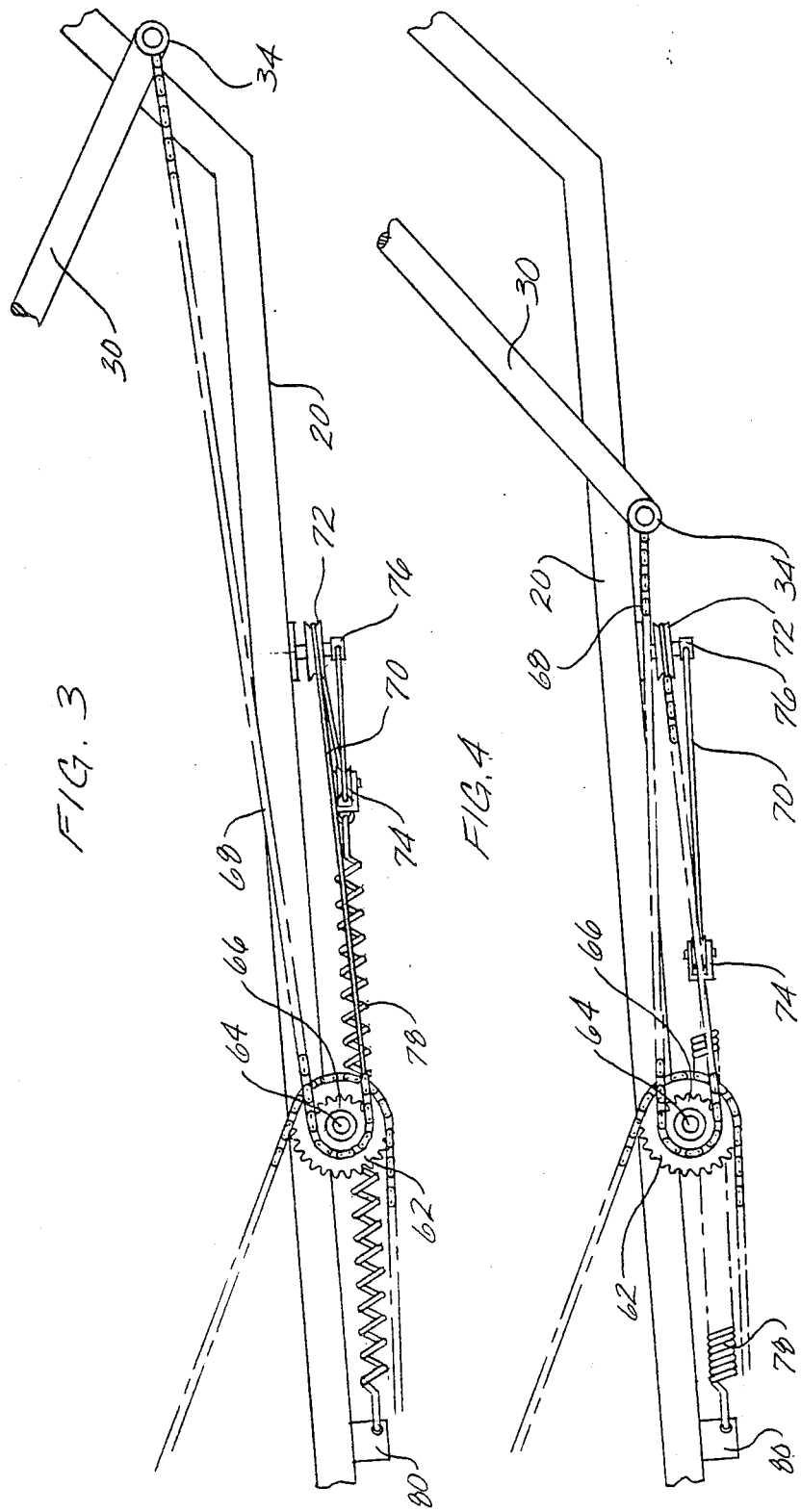

ROW BAR-ACTUATED LAND VEHICLE

FIELD OF THE INVENTION

This invention provides a land vehicle propelled by reciprocating a row bar to provide upper body exercise and means of transportation.

BACKGROUND OF THE INVENTION

Rowing is a useful form of exercise for conditioning the upper body and for enhancing cardiovascular fitness. In recent years, stationary rowing machines have been a popular in-home exercise device for the upper body. Various forms of land vehicles propelled by reciprocating a row bar have also been used in the past. These vehicles are useful because the rowing motion that produces conditioning for the upper body also is put to use as a mode of transportation.

Some prior art land vehicles have the disadvantages of being too heavy, cumbersome or expensive; they are not easily driven or steered, especially at high speeds; or the drive mechanisms are not efficient in transferring power from the rowing motion to the driven wheels of the vehicle.

SUMMARY OF THE INVENTION

This invention provides a wheeled vehicle of the row bar-type in which upper body exercise propels the vehicle. The vehicle is of relatively simple construction, including the drive system, which makes the vehicle reasonably inexpensive to manufacture. In addition, the vehicle can be easily driven and steered, especially at high speeds. The drive mechanism is especially efficient in transferring power from the rowing motion of the row bar directly to the driven wheels of the vehicle. As a result, the vehicle provides a good means of upper body exercise as well as a useful means of transportation. The vehicle is especially useful as a means of transportation on bicycle paths along the shoreline and beach areas.

Briefly, one embodiment of the invention comprises a vehicle having a frame for supporting a rider, together with a front wheel mounted on a front portion of the frame and a pair of rear wheels mounted on opposite rear sides of the frame. The front wheel is steered by the feet of the rider, while an elongated row bar mounted to a pivot on a fulcrum carried on the frame is used to propel the vehicle. The row bar has an upper portion which moves forward and is pulled backward by the rider to thereby reciprocate the row bar and cause a lower portion of the row bar to reciprocate in backward and forward directions, respectively. A drive sprocket is mounted on the frame to the rear of the row bar. A fixed pulley is mounted to the frame between the bottom of the row bar and the drive pulley. A traveling pulley travels between the fixed pulley and the drive sprocket. A drive chain extends from the bottom portion of the row bar, around the drive pulley and then toward the fixed pulley to a connection to an elongated inelastic cable extending from the drive chain, around the fixed pulley and back toward the traveling pulley, around the traveling pulley and then back to a fixed point of attachment on the frame. A return spring extends from the traveling pulley away from the fixed pulley to a fixed point of attachment to the frame.

The drive system operates by causing a pulling motion of the row bar to move the drive chain in a forward direction, against the bias of the return spring, to drive the drive sprocket. A separate drive is coupled between the rear wheels and the drive sprocket for driving the rear wheels to propel the vehicle in a forward direction in response to the drive sprocket being driven by the row bar. A forward motion of the row bar allows the drive chain to travel in a backward direction, which allows free-wheeling of the rear wheels, while the return spring maintains tension on the drive chain and the cable in response to the backward travel of the drive chain.

The drive chain provides a direct, efficient drive for the vehicle. The chain return system has minimal return spring resistance due to the return spring and traveling pulley keeping the drive system taut during use. The cable and return spring normally return the row bar to a return (or forward) position so the vehicle can coast without the row bar moving. The drive system can be located underneath the vehicle, away from interfering with the rider. Standard bicycle parts also can be used in constructing the vehicle. The result is a simple, inexpensive, light weight vehicle. In addition, the vehicle has a short turning radius since the feet of the rider can be used solely to steer the vehicle. The vehicle drive can propel the vehicle at high speed, and the vehicle can be constructed so it is low to the ground, adding safety, including the ability to maneuver and turn rapidly even at high speeds.

These and other aspects of the invention will be more fully understood by referring to the following detailed description and the accompanying drawings.

BRIEF DESCRIPTION OF THE DRAWINGS

FIG. 3 is an enlarged semi-schematic side elevation view illustrating the drive system in its operative position in which the row bar has been pulled back to drive the vehicle; and FIG. 4 is a semi-schematic side elevation view illustrating the drive system of FIG. 3 in its normal return position.

DETAILED DESCRIPTION OF THE DRAWINGS

Figure 1:
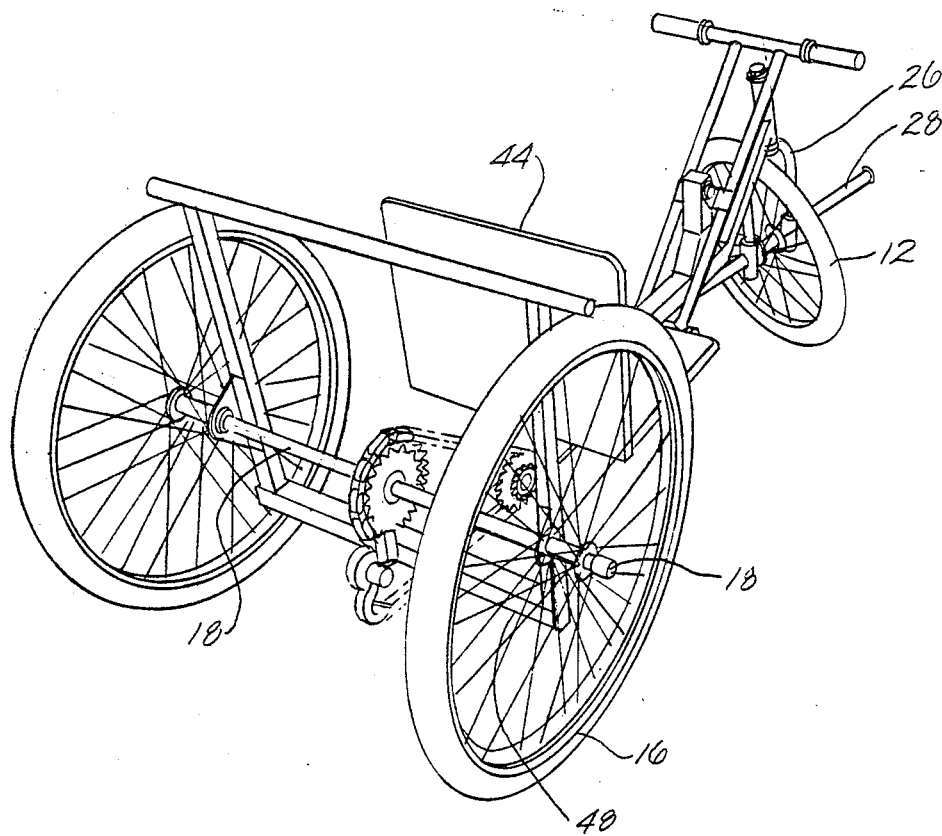
FIG. 1 is a rear perspective view illustrating a row bar-type land vehicle according to principles of this invention.
Figure 2:
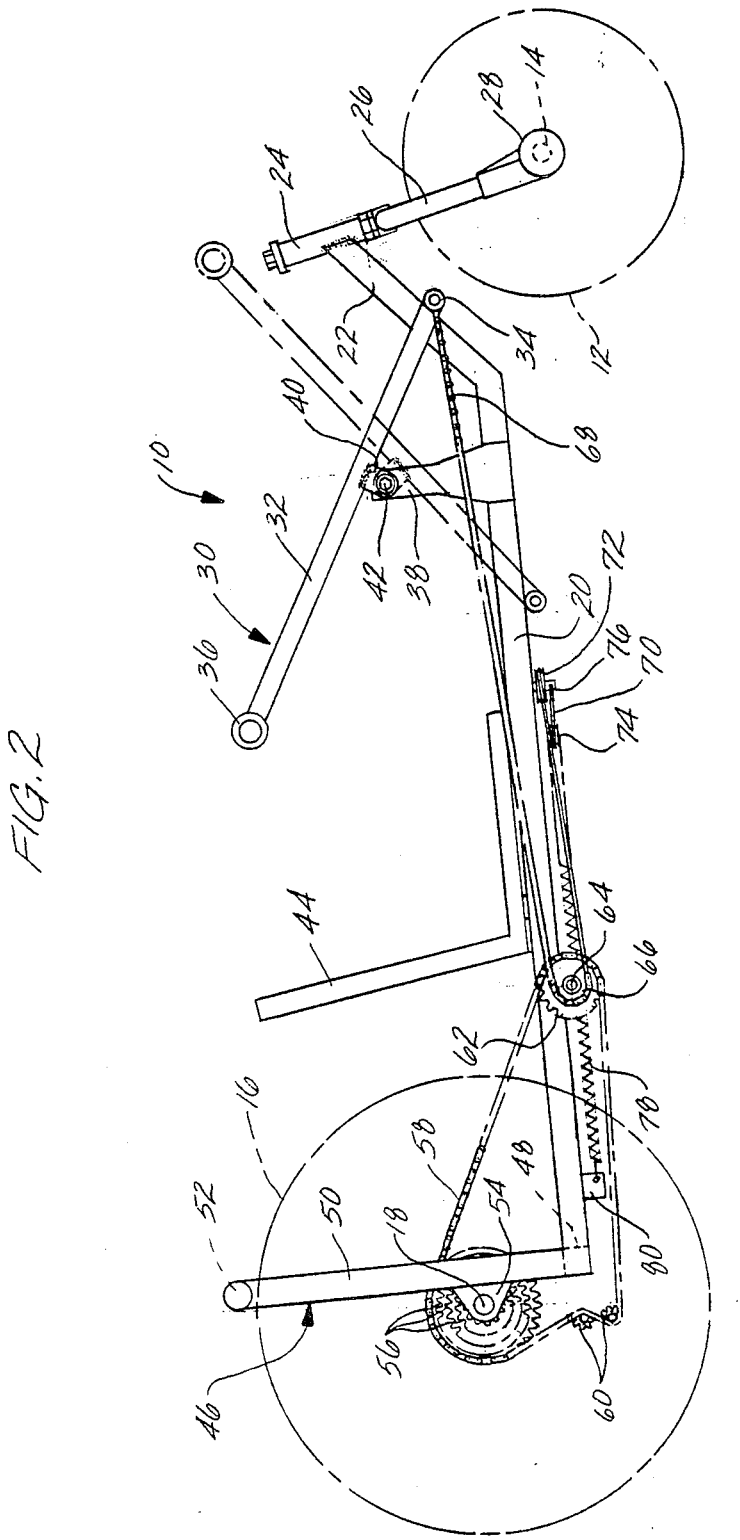
FIG. 2 is a semi-schematic side elevation view illustrating a drive system for the vehicle.

FIG. 1 illustrates a row bar-actuated land vehicle 10 according to principles of this invention. FIG. 2 is a semi-schematic side view also illustrating basic components of the vehicle drive system. As shown best in FIG. 1, the vehicle has a single smaller-diameter front wheel 12 rotatable about a front axle 14, and pair of larger-diameter rear wheels 16 rotatable about a rear axle 18. The vehicle frame primarily consists of a single elongated main frame member 20 running most of the length of the vehicle, substantially along the long axis of the vehicle. At the front of the main frame member and angular front frame member 22 extends upwardly and forwardly to a remote end which supports a fixed upright post 24 at the front of the vehicle. A fork 26 carried at the bottom of the post rotates about the axis of the post. A pair of foot-supporting steering bars 28 project outwardly from opposite sides of the front wheel axle. The foot bars are used by the feet of the rider to rotate the fork about its axis to steer the front wheel.

An elongated row bar 30 is pivotally mounted to the front of the vehicle. The row bar preferably includes a pair of long, spaced apart and parallel chain-actuating bars 32 fastened at the bottom by a horizontally-extending bottom crossbar 34. The drive chain of the drive system is attached to the bottom crossbar, as described in more detail below. A horizontally extending upper handle bar 36 is rigidly affixed to the upper portions of the handle bar project away from the sides of the long bars 32 to provide hand grip areas held by the rider when rowing. The handle bar also provides a means for mounting hand brakes (not shown) and gears (not shown) for the vehicle drive system.

The row bar is pivotally mounted to an upper portion of an upright fulcrum 38 which is rigidly affixed to a front portion of the main frame member. Brackets 40 extend downwardly from the two long bars adjacent opposite sides of the fulcrum, and a pivot pin 42 secures the row bar to the fulcrum so the row bar can pivot about a transverse axis through the fulcrum. The long bars 32 of the row bar are of sufficient length so that a rider sitting on a seat 44 can reach the handle bar portion of the row bar as the row bar pivots between an extended (forward or return) position shown in phantom lines in FIG. 2 and a retracted position shown in solid lines in FIG. 2. The crossbar 34 at the bottom of the row bar engages the frame 20 in the return position of the row bar. The crossbar 34 also engages the bottom of the angular frame member 22 in the retracted position of the row bar. These act as stops at opposite ends of row bar travel.

The seat 44 is mounted on a central portion of the main frame member 20 as illustrated in the example shown in FIGS. 1 and 2. Alternatively, the seat can comprise a generally upwardly-opening "U"-shaped framework of curved tubular metal support members for holding a flexible seat made of woven nylon or the like.

An upright rectangular frame 46 is mounted at the rear of the vehicle to extend upwardly above the main frame member 20. The frame 46 includes a horizontally extending elongated lower cross-member 48 extending outwardly from opposite sides of the main frame member 20 along the space between the two rear wheels 16. A pair of upright rear frame members 50 are affixed to opposite ends of the lower cross-member 48 for extending upwardly along the insides of the two rear wheels. An upper cross-member 52 is affixed at its ends to the upper portions of the upright members 50. The rectangular frame 46 provides a rigid structural framework for holding the rear axle 18 which is mounted at opposite ends to brackets 54 rigidly affixed to the uprights 50. The central portion of the axle 18 also can be supported by a separate bracket (not shown) supported on the bottom cross-member 48.

A group of multi-speed gear sprockets 56 are mounted for rotation on the midpoint of the axle 18 in the space between the two rear wheels. The gear sprockets can be a conventional bicycle gear sprocket arrangement of the five-speed or ten-speed type, for example. An endless gear chain 58 is engaged with one of the sprockets 56 in the conventional manner. The vehicle is equipped with gears (not shown) shifted by the rider in the usual manner for shifting engagement of the gear chain 58 with individual sprockets 56. The sprockets are of the conventional type in the sense that the sprockets 56 are rotatable in a forward direction (clockwise in FIG. 2) when the chain 58 travels in the direction for driving the vehicle, while the sprockets 56 are able to free-wheel when the chain 58 comes to a rest or is rotated in the reverse direction. The gear chain also is coupled to a conventional derailleur 60.

The gear chain 58 also is coupled at its forward end to a small driven sprocket 62 mounted on a bracket adjacent the side of the main frame member 20. The driven sprocket 62 rotates about a shaft 64 carried on the mounting bracket affixed to the frame member 20. Rotation of the driven sprocket 62 in a forward direction drives the rear sprockets 56 in unison, whereas reverse rotation of the driven sprocket 62 causes the gear sprockets 56 to freewheel.

A small drive sprocket gear 66 is concentrically mounted on the same shaft 64 as the driven sprocket 62. The drive sprocket 66 is engaged with a drive chain 68 which is part of a combination chain-cable drive system of this invention. A forward end of the drive chain 68 is affixed to a bottom portion of the row bar 30. The drive chain 68 extends from the bottom of the row bar along the side of the main frame member and is wrapped around the top rear portion of the drive sprocket 66. The opposite length of chain then extends from the bottom of the sprocket 66 toward the front of the vehicle, also along the side of the frame member 20. The forward end of the drive chain is affixed to a cable 70 which comprises a component of the drive chain control and return mechanism. The cable 70 is preferably any inelastic tension member such as a flexible metal cable. The cable is affixed to the end of the drive chain 68 and then extends forwardly for wrapping around a stationary pulley 72 mounted for rotation to a lower portion of the main frame member 20. After the cable wraps around the stationary pulley, the cable is reversed and extends to the rear of the vehicle where it wraps around a traveling pulley 74. The cable then extends from the traveling pulley in a forward direction to an end rigidly affixed at 76 to a post on which the stationary pulley rotates.

A return spring 78 of the coil spring type is affixed at its rear to a bracket 80 affixed to the main frame member 20 between the rear wheels of the vehicle. The return spring extends from the bracket 80 in the forward direction where its opposite end is affixed to the traveling pulley 74.

Operation of the chain drive system is best understood by referring to FIGS. 3 and 4. In these figures, the drive system components are shown in a schematic fashion and are spread apart to reveal the different components for clarity. FIG. 3 shows the drive system when the row bar 30 has been pulled back by the rider to rotate the row bar about its axis so as to propel the vehicle in a forward direction. When the rider pulls back on the upper portion of the row bar, the lower portion 34 of the row bar is rotated through an arc in a forward direction away from the fulcrum 38. This forward rotation of the bottom of the row bar pulls forward on the drive chain 68, causing the drive chain to travel in a forward direction. This, in turn, rotates the drive sprocket 66 engaged with the drive chain 68. Inasmuch as the drive sprocket 66 and the driven sprocket 62 are coupled to the same drive shaft 64, the gear chain 58 is rotated in response to rotation of the driven gear 62 for driving one of the gear sprockets 56. This, in turn, drives the rear wheels of the vehicle in a forward direction so as to propel the vehicle. As alluded to earlier, the different gearing provided by the derailleur 60 controls the speed of the vehicle in response to rowing motion of the row bar.

In response to this forward travel of the drive chain 68, the cable 70 follows the drive chain 68 and passes around the stationary pulley 72 and pulls on the traveling pulley 74 to cause the traveling pulley to move in a forward direction, shown in FIG. 3. The traveling pulley thus moves toward the stationary pulley 72 when the top of the row bar is pulled so as to propel the vehicle. The traveling motion of the traveling pulley 74 stretches the return spring 78, as illustrated in FIG. 3.

When the pulling force on the top of the row bar is released, the return spring 78 returns the row bar 30 to its forward or return position shown in FIG. 4 and in phantom lines in FIG. 2. The return spring applies a sufficient amount of spring force to the traveling pulley 74 to pull on the cable 70 which, in turn, pulls on the drive chain 68. This draws the upper portion of the drive chain in a rear direction to pull on the bottom of the row bar so as to automatically pivot the row bar to its return position shown in FIG. 4.

The combination cable 70, traveling pulley 74, and return spring 78 maintain the drive chain 68 in a taut condition during the full range of motion of the row bar. Normally, when the row bar is pulled backward to drive the vehicle, the applied pulling force is easily sufficient to overcome the spring force of the return spring 78, and the cable 70 simply follows travel of the drive chain 68. When the row bar is either pushed forward under pressure or the pressure on the row bar is released, the row bar automatically moves to its forward (return) position under the tension applied by the return spring and cable combination.

The vehicle allows the user to travel about while developing upper body strength in the rowing exercise necessary to propel the vehicle. The vehicle therefore allows the user to exercise outdoors in lieu of using stationary rowing machines commonly used indoors or in health clubs. The vehicle can travel up to about 20 to 25 mph; it can have multi-speed gears and hand brakes; and steering is done exclusively with the feet while the user rows the row bar to move the cart. The drive system is simple and inexpensive yet very effective in transferring the exercising energy from the user to the power necessary to propel the vehicle. In addition the vehicle has advantages of light weight, and is easily maneuverable, even at high speeds.

What is claimed is:

1. A wheeled vehicle of the row bar-type for propelling a rider on the vehicle in response to upper body exercise of the rider producing a rowing motion of the row bar, the vehicle comprising:
    a frame for supporting the weight of a rider;
    a front wheel mounted on a front portion of the frame;
    a pair of rear wheels mounted on opposite sides of the frame;
    front steering means on the front wheel for steering the vehicle with the feet of the rider;
    an elongated row bar mounted to pivot about a fulcrum carried on the frame, the row bar having an upper portion which moves forward and is pulled backward by the rider to thereby reciprocate the row bar and cause a lower portion of the row bar to reciprocate in the backward and forward directions, respectively;
    a drive sprocket mounted on the frame to the rear of the row bar;
    a fixed pulley mounted on the frame between the bottom of the row bar and the drive sprocket;
    a travelling pulley for travelling between the fixed pulley and the drive sprocket;
    drive means comprising a drive chain extending from the bottom portion of the row bar, around the drive sprocket and toward the fixed pulley to an elongated inelastic cable extending from the drive chain, around the fixed pulley, back around the travelling pulley, and back to a fixed point of attachment on the frame;
    a return spring extending from the travelling pulley away from the fixed pulley and to a fixed point of attachment on the frame, whereby a pulling force applied to said row bar pivots the bottom of the row bar in the forward direction to move the drive chain in the forward direction, against the bias of the return spring, to thereby drive the drive sprocket; and
    means coupled between the rear wheels of the drive sprocket for driving the rear wheels to propel the vehicle in the forward direction in response to the drive sprocket being driven by the row bar and the drive chain;
    the drive means allowing travel of the drive chain in the backward direction in response to a release of said pulling force on the row bar, which allows free-wheeling of the rear wheels while the return spring applies tension to the drive chain and the cable in response to the backward travel of the drive chain.

2. Apparatus according to claim 1 including a single front wheel steered solely by the feet applying pressure to bars projecting from opposite sides of the front wheel.

3. Apparatus according to claim 1 in which the drive chain extends directly from the bottom portion of the row bar along the central axis of the vehicle to the connection of the drive chain to the drive sprocket.

4. Apparatus according to claim 3 including a driven sprocket rotatable about the same axis as the drive sprocket so that the driven sprocket is rotated in response to rotation of the drive sprocket.

5. Apparatus according to claim 1 in which the return spring extends under the frame and is fixed to the traveling pulley under the frame.

* * * * *